A. Williams,
Steam-Boiler Indicator.
N° 23,994. Patented May 10, 1859.
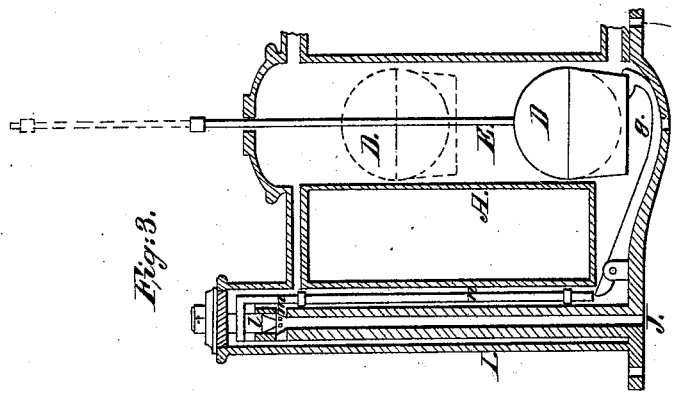
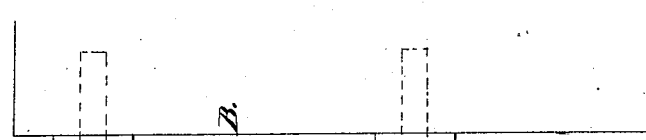
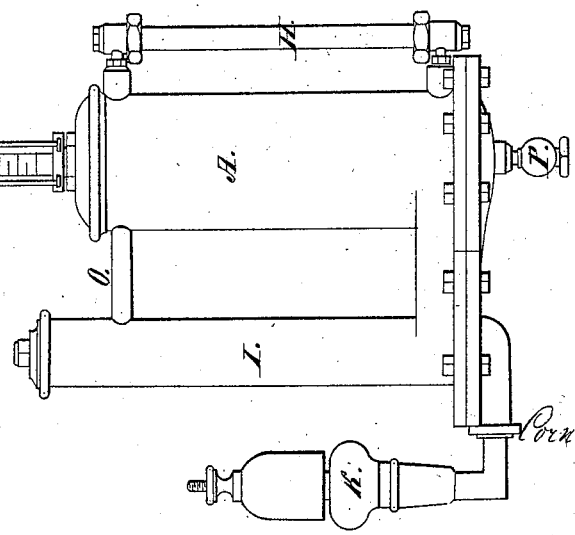

UNITED STATES PATENT OFFICE.

CORNELIA H. WILLIAMS, OF WILLIAMSBURG, NEW YORK, ADMINISTRATRIX OF AUGUSTUS WILLIAMS, ASSIGNOR TO ANTHONY POLLAK, ASSIGNOR TO A. N. CLARK, OF BEVERLY, MASSACHUSETTS.

STEAM AND WATER GAGE.

Specification of Letters Patent No. 23,994, dated May 10, 1859.

*To all whom it may concern:*

Be it known that AUGUSTUS WILLIAMS, late of Williamsburg, in the county of Kings and State of New York, deceased, did invent certain new and useful Improvements in Water-Gages for Steam-Boilers; and I, CORNELIA H. WILLIAMS, of said Williamsburg, administratrix of the goods and estate of said deceased, do hereby declare that the following is a full, clear, and exact description of the said invention, reference being had to the annexed drawings, making part of this specification, in which—

Figure 1 is a front elevation of the water gage, Fig. 2 is a side elevation, showing its connection with the boiler, and Fig. 3 is a vertical section.

This invention is for an improved apparatus for ascertaining the height of water in steam boilers and also for signalizing by an alarm whenever the water is suffered to fall below a given point.

The apparatus consists of a chamber bolted to the boiler at about the proper height the water is to be carried. A communication is formed between the inside of the boiler and the inside of the chamber, by pipes at two points, one of which is to be above the ordinary water level, and the other always below. Then by means of a float in said chamber, the position of which is indicated by a pointer playing up and down in a glass tube, an alarm can be sounded, whenever the water falls too low, by the float resting at such time upon a lever which opens a steam valve connected with a steam whistle. A glass tube is also combined with the chamber to enable the engineer to see the water, as by the following description will more fully be shown:

At (A) is a metal tube, chamber or cylinder varying in length according to the desired range of water. It is connected to the boiler by two pipes, as shown in Fig. 2, in each of which is a cock, by which the connection with the boiler may be cut off whenever desired. Within the cylinder (A) is a float D, which rises up and down freely with the fluctuations of the water. The rod E is attached to the top of said float and passes through an aperture in the head of the cylinder (A). This aperture is covered with a glass tube (F) which is closed at the top and is made tight on the head of the cylinder A by suitable perching. This tube is supported and defended from injury by three rods (G) which are attached to the glands of the stuffing-box, and connected with a cap at the upper end, or by a casing surrounding it partially so as to leave an opening in front for the inspection of the pointer.

(H) is a glass water gage properly connected with the cylinder A.

(I) is a tube or chamber of less diameter than the cylinder A and communicating therewith by means of two channels arranged at the top and bottom of the said chamber. This tube I incloses a pipe (J) which communicates at the lower end with the alarm whistle (K).

In the upper end of the pipe J is a valve rest in which sets the valve L (when closed) and on the same upper end are holes or openings (M) which when the valve (L) is raised, allow the steam to escape through the pipe (J) and the whistle (K). The pipe J extends up to near the top of the tube I, the object of which is to insure its being above the water in the gage so that when the valve is opened, only steam will pass through the whistle.

The valve L is attached to the lifting rod $n$, the lower end of which rests on the end of the lever $g$, and is so arranged that it will be closed by its own weight and that of the rod except when it is opened by the falling of the float D, as described below.

(P) is a cork placed in the bottom of the cylinder K for blowing out any sediment which may collect.

The operation of the instrument is thus: First: The float (D) rising and falling with the water, rises and lowers the rod (E) the end of which being visible in the glass tube (F), constantly indicates the level of the water. Secondly: The glass water gage H being connected with the boiler, also constantly indicates to the eye the level of the water within. These two instruments therefore check and correct each other. Thirdly: If either through absence, negelect, or any other cause, the water is allowed to get low in the boiler, the float D inevitably will fall and rest upon the longer end of the lever $g$, causing that end to go down, and, of course, the other to rise, and lift with it the lifting rod N and the valve (L) which, allowing a free passage through the hole ($m$), the steam will rush through these holes and through the pipe (J) and blow the whistle (K), producing a loud alarm, which will continue until the danger threatened is removed by a proper supply of water to the boiler.

It is obvious that the instrument may be so placed that the alarm will be sounded at any level of water desired, and that, consequently it may be arranged so as to give the alarm in due time while danger is yet only approaching without waiting for its actual arrival.

These instruments may be furnished with steam pressure gages and the whole combination would thus indicate constantly to the eye the pressure of steam and the level of water (the two facts which enable the engineer to avoid all possible danger of explosion) and if danger does approach, give timely notice to the ear of its coming.

What is claimed as the invention of the said deceased and which it is desired to secure by Letters Patent is—

1. Combining the vessel separate and distinct from, but connected to the boiler by means of two pipes as described, containing a float having an indicator or pointer attached thereto, with the transparent tube or steam chamber when said parts are constructed and arranged in relation to each other to operate in the manner and for the purposes substantially as set forth herein.

2. The general arrangement of the instrument for forming an alarm-water gage, by combining with the indicator water gage constructed as described a whistle attached to a separate chamber containing a valve arranged to be operated by the float so as to admit steam to said whistle to give alarm when required, substantially as set forth.

In testimony whereof I have hereunto subscribed my name.

CORNELIA H. WILLIAMS,
*Administratrix.*

Witnesses:
S. H. MAYNARD,
GEORGE H. MOTT.